United States Patent
Kodemura et al.

(10) Patent No.: US 11,192,983 B2
(45) Date of Patent: Dec. 7, 2021

(54) PRODUCTION METHOD FOR POLYMER LATEX

(71) Applicant: ZEON CORPORATION, Tokyo (JP)

(72) Inventors: Junji Kodemura, Tokyo (JP); Yoshitaka Satoh, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/753,578

(22) PCT Filed: Oct. 4, 2018

(86) PCT No.: PCT/JP2018/037164
§ 371 (c)(1),
(2) Date: Apr. 3, 2020

(87) PCT Pub. No.: WO2019/073890
PCT Pub. Date: Apr. 18, 2019

(65) Prior Publication Data
US 2020/0299464 A1    Sep. 24, 2020

(30) Foreign Application Priority Data

Oct. 11, 2017  (JP) ............................. JP2017-197735

(51) Int. Cl.
| | | |
|---|---|---|
| *C08C 19/08* | (2006.01) | |
| *C08J 3/07* | (2006.01) | |
| *B29C 41/00* | (2006.01) | |
| *B29C 41/14* | (2006.01) | |
| *C08F 236/08* | (2006.01) | |
| *B29K 105/00* | (2006.01) | |

(52) U.S. Cl.
CPC ............... *C08J 3/07* (2013.01); *B29C 41/003* (2013.01); *B29C 41/14* (2013.01); *C08C 19/08* (2013.01); *C08F 236/08* (2013.01); *B29K 2105/0064* (2013.01); *C08J 2309/10* (2013.01); *C08J 2409/10* (2013.01)

(58) Field of Classification Search
CPC ....... B29C 41/003; B29C 41/14; C08C 19/08; C08C 2019/09; C08J 3/07
See application file for complete search history.

(56) References Cited

U.S. PATENT DOCUMENTS

| | | | |
|---|---|---|---|
| 5,336,712 A * | 8/1994 | Austgen, Jr. ............... | C08J 3/07 523/340 |
| 2005/0119452 A1* | 6/2005 | Yamaguchi ............. | C08C 19/08 528/480 |
| 2015/0087761 A1* | 3/2015 | Satoh ........................ | C08L 9/10 524/432 |
| 2015/0232584 A1* | 8/2015 | Rempel ................... | C08C 19/02 525/338 |
| 2016/0122457 A1* | 5/2016 | Katada .................... | C08C 19/36 525/329.3 |
| 2019/0023854 A1 | 1/2019 | Ishii et al. | |

FOREIGN PATENT DOCUMENTS

WO    2017/135144 A1    8/2017

OTHER PUBLICATIONS

Jan. 15, 2019 Search Report issued in International Patent Application No. PCT/JP2018/037164.

* cited by examiner

*Primary Examiner* — Robert C Boyle
(74) *Attorney, Agent, or Firm* — Oliff PLC

(57) ABSTRACT

A method for producing a polymer latex includes: a preparation step of reducing the weight average molecular weight of a conjugated diene polymer (A) by 20 to 70 mass %, thereby obtaining an organic solvent solution containing a conjugated diene polymer (B) having a weight average molecular weight lower than that of the conjugated diene polymer (A); and an emulsification step of emulsifying the organic solvent solution in water in the presence of a surfactant, thereby obtaining a polymer latex.

9 Claims, No Drawings

PRODUCTION METHOD FOR POLYMER LATEX

TECHNICAL FIELD

The present invention relates to a method for producing a polymer latex, more particularly to a highly productive method for producing a polymer latex that has high mechanical stability and that can provide a dip-molded product having high tensile strength and tear strength.

BACKGROUND ART

Conventionally, molded films such as dip-molded products obtained by dip-molding latex compositions containing natural or synthetic rubber latex have been suitably used as nipples, air balls, gloves, balloons, stalls, and the like.

For example, Patent Document 1 discloses a method for producing a polymer latex, the method comprising an emulsification step of emulsifying a polymer solution in water in the presence of a surfactant to obtain an emulsion, the polymer solution being prepared by dissolution of synthetic polyisoprene and/or a styrene-isoprene-styrene block copolymer having a molecular weight distribution of 1.0 to 2.6 in an organic solvent, wherein when the synthetic polyisoprene and/or the styrene-isoprene-styrene block copolymer is in the form of a solution in the organic solvent which has a viscosity at 60° C. of 20,000 cps, the solids content is 10 to 60 wt %.

However, there is a need for a highly productive production method that enables producing a polymer latex that has higher mechanical stability than that in the method described in Patent Document 1 and also provides a dip-molded product having high tensile strength and tear strength.

RELATED ART

Patent Document

PATENT DOCUMENT 1: WO2017/135144

SUMMARY OF THE INVENTION

Problem to be Solved by the Invention

The present invention is completed in view of solving the problem above. An object of the present invention is to provide a highly productive method for producing a polymer latex that has high mechanical stability and that can provide a dip-molded product having high tensile strength and tear strength.

Means for Solving the Problem

As a result of dedicated research to achieve the aforementioned object, the inventors have found that the object can be achieved by reducing the molecular weight of a conjugated diene polymer during production of a polymer latex, and have accomplished the present invention.

That is, the present invention provides a method for producing a polymer latex, the method comprising:

a preparation step of reducing the weight average molecular weight of a conjugated diene polymer (A) by 20 to 70 mass %, thereby obtaining an organic solvent solution containing a conjugated diene polymer (B) having a weight average molecular weight lower than that of the conjugated diene polymer (A), and an emulsification step of emulsifying the organic solvent solution in water in the presence of a surfactant, thereby obtaining a polymer latex.

In the preparation step of the method for producing a polymer latex according to the present invention, it is preferable that the conjugated diene polymer (B) be obtained by applying mechanical stress to the conjugated diene polymer (A) to reduce the weight average molecular weight of the conjugated diene polymer (A), and then be dissolved in an organic solvent to obtain the organic solvent solution containing the conjugated diene polymer (B).

In the preparation step of the method for producing a polymer latex according to the present invention, it is preferable that a molecular cutting agent be added to an organic solvent solution containing the conjugated diene polymer (A) to reduce the weight average molecular weight of the conjugated diene polymer (A), thus obtaining the organic solvent solution containing the conjugated diene polymer (B).

In the preparation step of the method for producing a polymer latex according to the present invention, the molecular cutting agent is preferably a peroxide or ozone.

In the method for producing a polymer latex according to the present invention, the molecular weight distribution of the conjugated diene polymer (B) is preferably in the range from 2.7 to 3.3.

In the method for producing a polymer latex according to the present invention, the weight average molecular weight of the conjugated diene polymer (A) is preferably in the range from 1,000,000 to 5,000,000.

Further, the present invention provides a method for producing a latex composition, the method comprising preparing a latex composition by compounding a crosslinker to the polymer latex after the polymer latex is obtained by the aforementioned production method.

Further, the present invention provides a method for producing a molded film, the method comprising preparing a molded film by dip-molding the latex composition after the latex composition is obtained by the aforementioned production method.

Effects of Invention

The present invention can provide a highly productive method for producing a polymer latex that has high mechanical stability and that can provide a dip-molded product having high tensile strength and tear strength.

DESCRIPTION OF EMBODIMENTS

A method for producing a polymer latex according to the present invention comprising:

a preparation step of reducing the weight average molecular weight of a conjugated diene polymer (A) by 20 to 70 mass %, thereby obtaining an organic solvent solution containing a conjugated diene polymer (B) having a weight average molecular weight lower than that of the conjugated diene polymer (A), and an emulsification step of emulsifying the organic solvent solution in water in the presence of a surfactant, thereby obtaining a polymer latex.

<Conjugated Diene Polymer (A)>

First, the conjugated diene polymer (A) used in the production method according to the present invention will be described.

The conjugated diene polymer (A) used in the present invention can be any conjugated diene polymer without limitation, and various polymers can be used without limitation. Examples thereof include natural rubber; homopolymers or copolymers of conjugated diene monomers such as synthetic polybutadiene, synthetic polyisoprene, and synthetic polychloroprene; copolymers of conjugated diene monomers with different monomers copolymerizable therewith, such as styrene-butadiene copolymers, styrene-isoprene copolymers, styrene-isoprene-styrene block copolymers, acrylonitrile-butadiene copolymers, acrylonitrile-isoprene copolymers, acrylonitrile-butadiene-isoprene copolymers, and butyl acrylate-butadiene copolymers; acrylate (co)polymers; and the like. Among these, natural rubber, synthetic polyisoprene, styrene-isoprene-styrene block copolymers are preferable, and synthetic polyisoprene and styrene-isoprene-styrene block copolymers are more preferable from the viewpoint of high effect obtained in the case where the production method according to the present invention is applied.

To further improve the mechanical stability of the resulting polymer latex and to provide a dip-molded product having improved tensile strength and tear strength, the weight average molecular weight (Mw) of the conjugated diene polymer (A) is preferably in the range from 1,000,000 to 5,000,000, more preferably from 1,200,000 to 4,500,000, further more preferably 1,500,000 to 4,000,000 as determined relative to polystyrene standards by gel permeation chromatography.

To further improve the mechanical stability of the resulting polymer latex and to provide a dip-molded product having improved tensile strength and tear strength, the molecular weight distribution (Mw/Mn) of the conjugated diene polymer (A) is preferably in the range from 1.5 to 10, more preferably from 2.0 to 5.0 as determined relative to polystyrene standards by gel permeation chromatography. The molecular weight distribution (Mw/Mn) can be determined from the weight average molecular weight (Mw) as determined relative to polystyrene standards by gel permeation chromatography and the number average molecular weight (Mn) as determined relative to polystyrene standards by gel permeation chromatography.

The synthetic polyisoprene may be an isoprene homopolymer or may be a copolymer of isoprene with different ethylenically unsaturated monomer(s) copolymerizable with isoprene. The content of isoprene units in the synthetic polyisoprene is preferably 70 wt % or more, more preferably 90 wt % or more, further more preferably 95 wt % or more, particularly preferably 100 wt % (homopolymer of isoprene) with respect to the total monomer units to facilitate preparation of a molded film, such as a dip-molded product, which is flexible and has excellent tensile strength and tear strength in the case where the molded film, such as a dip-molded product, is famed using the polymer latex obtained by the production method according to the present invention.

Examples of the different ethylenically unsaturated monomers copolymerizable with isoprene include conjugated diene monomers other than isoprene such as butadiene, chloroprene, and 1,3-pentadiene; ethylenically unsaturated nitrile monomers such as acrylonitrile, methacrylonitrile, fumaronitrile, and α-chloroacrylonitrile; vinyl aromatic monomers such as styrene and alkyl styrenes; ethylenically unsaturated carboxylic acid ester monomers such as methyl (meth)acrylate (which means "methyl acrylate and/or methyl methacrylate", and hereinafter, the same applies to ethyl (meth)acrylate and the like), ethyl (meth)acrylate, butyl (meth)acrylate, and 2-ethylhexyl (meth)acrylate; and the like. One of these ethylenically unsaturated monomers copolymerizable with isoprene may be used alone, or two or more of them may be used in combination.

The synthetic polyisoprene can be obtained by conventionally known methods such as solution polymerization of isoprene optionally with the different ethylenically unsaturated copolymerizable monomer(s) in an inert polymerization solvent using a Ziegler polymerization catalyst composed of trialkylaluminum-titanium tetrachloride or an alkyl lithium polymerization catalyst such as n-butyl lithium or sec-butyl lithium. Although the polymer solution of the synthetic polyisoprene obtained by the solution polymerization may be used as it is in production of the polymer latex (synthetic polyisoprene latex) according to the present invention, the solid synthetic isoprene extracted from the polymer solution may be used in the production thereof. Alternatively, the solid synthetic isoprene may be extracted from the polymer solution and be dissolved in an organic solvent, and then the resulting solution may be used in the production of the polymer latex according to the present invention.

At this time, impurities such as the residual polymerization catalyst remaining in the polymer solution after the synthesis may be removed. Further, an antioxidant described below may be added to the solution during or after the polymerization. Further, a commercially available solid synthetic polyisoprene can be used.

There are the following four types of isoprene units in the synthetic polyisoprene which differ in bonding geometry of isoprene units: cis bond unit, trans bond unit, 1,2-vinyl bond unit, and 3,4-vinyl bond unit. In the case where the polymer latex obtained by the production method according to the present invention is used in formation of a molded film such as a dip-molded product, to obtain a molded film, such as a dip-molded product, having improved tensile strength and tear strength, the content of cis bond units among the isoprene units contained in the synthetic polyisoprene is preferably 70 wt % or more, more preferably 90 wt % or more, further more preferably 95 wt % or more with respect to the total isoprene units.

To further improve the mechanical stability of the polymer latex and to provide a dip-molded product having improved tensile strength and tear strength, the weight average molecular weight of the synthetic polyisoprene is preferably in the range from 1,000,000 to 5,000,000, more preferably from 1,200,000 to 4,500,000, further more preferably 1,500,000 to 4,000,000 as determined relative to polystyrene standards by gel permeation chromatography.

To further improve the mechanical stability of the polymer latex and to provide a dip-molded product having improved tensile strength and tear strength, the molecular weight distribution (Mw/Mn) of the synthetic polyisoprene is preferably in the range from 1.5 to 10, more preferably from 2.0 to 5.0 as determined relative to polystyrene standards by gel permeation chromatography.

Further, the polymer/Mooney viscosity (ML1+4 at 100° C.) of the synthetic polyisoprene is preferably in the range from 50 to 100, more preferably from 60 to 95, further more preferably from 70 to 90, most preferably from 75 to 85.

The styrene-isoprene-styrene block copolymer is a block copolymer of styrene and isoprene (SIS) (the character "S" represents a styrene block, and the character "I" represents an isoprene block).

The SIS can be obtained by conventionally known methods such as block copolymerization of isoprene and styrene in an inert polymerization solvent using an active organic metal such as n-butyl lithium as an initiator. Although the polymer solution of the SIS obtained may be used as it is in the production of the polymer latex according to the present invention (SIS polyisoprene latex), solid SIS extracted from the polymer solution may be used in the production thereof. Alternatively, solid SIS may be extracted from the polymer solution and be dissolved in an organic solvent, and then the resulting solution may be used in the production of the polymer latex according to the present invention.

At this time, impurities such as the residual polymerization catalyst remaining in the polymer solution after the synthesis may be removed. Further, an antioxidant described below may be added to the solution during or after the polymerization. Further, a commercially available solid SIS can be used.

The content of styrene units in styrene blocks of the SIS is preferably 70 to 100 wt %, more preferably 90 to 100 wt %, further more preferably 100 wt % with respect to the total monomer units.

Further, the content of isoprene units in isoprene blocks of the SIS is preferably 70 to 100 wt %, more preferably 90 to 100 wt %, further more preferably 100 wt % with respect to the total monomer units.

The content ratio of styrene units to isoprene units in the SIS is generally in the range of 1:99 to 90:10, preferably 3:97 to 70:30, more preferably 5:95 to 50:50, further more preferably 10:90 to 30:70 as a weight ratio of "styrene units:isoprene units".

To further improve the mechanical stability of the polymer latex and to provide a dip-molded product having improved tensile strength and tear strength, the weight average molecular weight of the SIS is preferably in the range from 100,000 to 1,000,000, more preferably from 200,000 to 800,000, further more preferably 250,000 to 500,000 as determined relative to polystyrene standards by gel permeation chromatography.

To further improve the mechanical stability of the polymer latex and to provide a dip-molded product having improved tensile strength and tear strength, the molecular weight distribution (Mw/Mn) of the SIS is preferably in the range from 1.0 to 5.0, more preferably from 1.5 to 3.5 as determined relative to polystyrene standards by gel permeation chromatography.

<Preparation Step>

The preparation step in the production method according to the present invention is a step of reducing the weight average molecular weight of the conjugated diene polymer (A) by 20 to 70 mass %, thereby obtaining an organic solvent solution containing the conjugated diene polymer (B) having a weight average molecular weight lower than that of the conjugated diene polymer (A).

A polymer latex that has excellent mechanical stability can be obtained by reducing the weight average molecular weight of the conjugated diene polymer (A) by 20 to 70 mass % to generate the conjugated diene polymer (B) having a weight average molecular weight lower than that of the conjugated diene polymer (A) through the preparation step of the production method according to the present invention, and then emulsifying the organic solvent solution containing the conjugated diene polymer (B). Although the reasons why the mechanical stability of the polymer latex obtained by the production method according to the present invention are not necessarily clear, it is presumed as follows: In the preparation step, when the weight average molecular weight of the conjugated diene polymer (A) is reduced, a small number of polar groups are introduced to the polymer. The polar groups thus introduced impart the stability in water to the conjugated diene polymer (B).

The reduction ratio of weight average molecular weight of the conjugated diene polymer in the preparation step is 20 to 70%, preferably 20 to 60%, more preferably 30 to 55%, further more preferably 40 to 50%. Unless the weight average molecular weight is sufficiently reduced, the mechanical stability of the resulting polymer latex cannot be improved while the tensile strength and tear strength of the dip-molded product famed from the polymer latex is improved. On the other hand, if the weight average molecular weight is excessively reduced, the tensile strength and tear strength of the dip-molded product famed from the polymer latex cannot be improved while the mechanical stability of the resulting polymer latex is improved.

Although any organic solvent for dissolving or dispersing the polymer (for example, natural rubber, synthetic polyisoprene, SIS) to prepare the organic solvent solution can be used without limitation, examples thereof include aromatic hydrocarbon solvents such as benzene, toluene, and xylene; alicyclic hydrocarbon solvents such as cyclopentane, cyclopentene, cyclohexane, and cyclohexene; aliphatic hydrocarbon solvents such as pentane, hexane, and heptane; halogenated hydrocarbon solvents such as methylene chloride, chloroform, and ethylene dichloride; and the like. Among these, alicyclic hydrocarbon solvents are preferable, and cyclohexane is particularly preferable.

The amount of the organic solvent to be used is preferably 2,000 parts by weight or less, more preferably 20 to 1,500 parts by weight, further more preferably 50 to 1,000 parts by weight, particularly preferably 100 to 400 parts by weight with respect to 100 parts by weight of the polymer.

Any method for reducing the weight average molecular weight of the conjugated diene polymer (A) can be used without limitation. Examples thereof include a method of applying mechanical stress to the conjugated diene polymer (A), a method of adding a molecular cutting agent to the organic solvent solution containing the conjugated diene polymer (A), and the like. The method of applying mechanical stress and the method of adding a molecular cutting agent may be used in combination.

To obtain the organic solvent solution containing the conjugated diene polymer (B), a method can be used in which the weight average molecular weight of the conjugated diene polymer (A) is reduced under application of mechanical stress to the conjugated diene polymer (A) to obtain the conjugated diene polymer (B), and then the conjugated diene polymer (B) is dissolved in an organic solvent.

When mechanical stress is applied to the conjugated diene polymer (A), a method using shear force can be used. For example, internal mixers such as a Banbury mixer equipped with non-intermeshing rotors, a show mixer equipped with intermeshing rotors, and a kneader mixer; roll mills; extruders such as a Gordon plasticator, a transfer mixer, a cavity transfer mixer, a pin type mixer, and a twin-screw type extruder; and the like can be used.

Although mechanical stress may be applied to the conjugated diene polymer (A) under any conditions without limitation, mechanical stress is preferably applied in the air to further improve the mechanical stability of the polymer latex and to provide a dip-molded product having improved tensile strength and tear strength.

Although not particularly limited, the temperature at which mechanical stress is applied to the conjugated diene polymer (A), is preferably 25 to 250° C., more preferably 50 to 200° C. to further improve the mechanical stability of the polymer latex and to provide a dip-molded product having improved tensile strength and tear strength.

Although not particularly limited, the time for which mechanical stress is applied to the conjugated diene polymer (A) is preferably 0.01 to 1.0 hour, more preferably 0.1 to 0.5 hours to further improve the mechanical stability of the polymer latex and to provide a dip-molded product having improved tensile strength and tear strength.

Further, in the case where the method of adding a molecular cutting agent to the organic solvent solution containing the conjugated diene polymer (A) is used, any molecular cutting agent can be used without limitation. For example, peroxides, ozone, and the like can be used.

Examples of the peroxides include dialkyl peroxides such as di-o-methylbenzoyl peroxide, di-p-methylbenzoyl peroxide, dicumyl peroxide, 2,5-dimethyl-2,5-di(t-butylperoxy) hexane, 1,3-bis(t-butylperoxyisopropyl)benzene, t-butyl-cumyl peroxide, di-t-butyl peroxide, and 2,5-dimethyl-2,5-di(t-butylperoxy)hexyne-3; hydroperoxides such as p-methane hydroperoxide, diisopropylbenzene hydroperoxide, 1,1,3,3-tetramethylbutyl hydroperoxide, cumene hydroperoxide, and t-butyl hydroperoxide; diacyl peroxides such as diisobutyl peroxide, dilauroyl peroxide, di(3,5,5-trimethylhexanoyl) peroxide, di(3-methylbenzoyl) peroxide, and dibenzoyl peroxide; peroxydicarbonates such as di-n-propyl peroxydicarbonate, diisopropyl peroxydicarbonate, di(4-t-butylcyclohexyl) peroxycarbonate, and di(2-ethylhexyl) peroxydicarbonate; peroxy esters such as t-butyl peroxyneodecanoate, t-hexyl peroxyneodecanoate, 1,1,3,3-tetramethylbutyl peroxyneodecanoate, cumyl peroxyneodecanoate, t-butyl peroxyneoheptanoate, t-butyl peroxy-2-ethylhexanoate, t-hexyl peroxy-2-ethylhexanoate, 2,5-dimethyl-2,5-di(2-ethylhexanoylperoxy)hexane, t-butyl permaleic acid, t-butyl peroxy-3,5,5-trimethylhexanoate, t-butyl peroxyisopropylmonocarbonate, t-hexyl peroxyisopropylmonocarbonate, t-butyl peroxylaurate, t-hexyl peroxybenzoate, 2,5-dimethyl-2,5-(benzoylperoxy)hexane, t-butyl peroxyacetate, and t-butyl peroxybenzoate; peroxyketals such as n-butyl 4,4-di-(t-butylperoxy)valerate, 2,2-di-(t-butylperoxy) butane, 2,2-di(4,4-di-(t-butylperoxy) cyclohexyl)propane, 1,1-di(t-hexylperoxy)-3,5,5-trimethylcyclohexane, 1,1-di(t-butylperoxy)-2-methylcyclohexane, 1,1-di(t-butylperoxy)cyclohexane, and 1,1-di(t-hexylperoxy)cyclohexane; inorganic peroxides such as sodium persulfate, potassium persulfate, ammonium persulfate, potassium perphosphate, and hydrogen peroxide; and the like.

Although not particularly limited, the temperature at which the molecular cutting agent is added to the organic solvent solution containing the conjugated diene polymer (A) to reduce the molecular weight is preferably 25 to 200° C., more preferably 50 to 100° C. to further improve the mechanical stability of the polymer latex and to provide a dip-molded product having improved tensile strength and tear strength.

Although not particularly limited, the time for which the molecular cutting agent is added to the organic solvent solution containing the conjugated diene polymer (A) to reduce the molecular weight is preferably 0.1 to 2.0 hours, more preferably 0.5 to 1.0 hour to further improve the mechanical stability of the polymer latex and to provide a dip-molded product having improved tensile strength and tear strength.

The weight average molecular weight of the conjugated diene polymer (B) thus obtained is preferably in the range from 10,000 to 4,000,000, more preferably 300,000 to 2,000,000, further more preferably 500,000 to U.S. Pat. No. 1,500,000 to further improve the mechanical stability of the polymer latex and to provide a dip-molded product having improved tensile strength and tear strength.

The molecular weight distribution of the conjugated diene polymer (B) thus obtained is preferably in the range from 2.7 to 3.3, more preferably 2.75 to 3.25, further more preferably 2.8 to 3.2 to further improve the mechanical stability of the polymer latex and to provide a dip-molded product having improved tensile strength and tear strength.

Further, when the conjugated diene polymer (B) thus obtained is in the form of an organic solvent solution having a viscosity at 60° C. of 20,000·cps, the organic solvent solution preferably has a solids content in the range from 10 to 60 wt %. By controlling the amount of the conjugated diene polymer (B) in tams of solids content within the above range in the organic solvent solution having a viscosity at 60° C. of 20,000·cps, the polymer latex can be produced with high productivity. The temperature at which an emulsification step described below can be successfully performed is specifically 60° C. and the upper limit of the solution viscosity is usually at about 20,000 cps. By adjusting the solids content at such a solution viscosity within the range from 10 to 60 wt %, the emulsification can be performed at an appropriate production rate (production amount per unit time), thus producing the polymer latex with high productivity. Adjusting the solids content within the above range can facilitate molding such as dip molding without decreasing the production rate (production amount per unit time) in the emulsification. The solids content is preferably in the range from 10 to 60 wt %, preferably from 10 to 50 wt %, more preferably from 10 to 40 wt % in the case where the conjugated diene polymer (B) is in the form of an organic solvent solution having a viscosity at 60° C. of 20,000·cps.

The amount (in terms of solids content) of the conjugated diene polymer (B) in the organic solvent solution having a viscosity at 60° C. of 20,000·cps can be determined by preparing an organic solvent solution having a viscosity at 60° C. of 20,000·cps through adjustment of the amount of organic solvent in the organic solvent solution, and measuring the solids content of the prepared solution. The viscosity of the organic solvent solution can be measured, for example, using a B-type viscometer.

In the production method according to the present invention, as described below, in the step where the polymer latex is obtained by emulsifying the organic solvent solution of the conjugated diene polymer (B) in water in the presence of a surfactant, the organic solvent solution of the conjugated diene polymer (B) to be used is not specifically limited to an organic solvent solution having a viscosity at 60° C. of 20,000·cps, and those controlled to have different viscosities (such as about 15,000) at 60° C. may be used. However, because the solids content in the organic solvent solution is increased to increase the production rate (production amount per unit time) in the emulsification, the organic solvent solution of the conjugated diene polymer (B) preferably has a viscosity at 60° C. of about 20,000·cps (for example, a viscosity at 60° C. of 20,000·cps+/−100 cps).

<Emulsification Step>

The emulsification step in the production method according to the present invention is a step of emulsifying the organic solvent solution containing the conjugated diene polymer (B) in water in the presence of a surfactant, thereby obtaining a polymer latex.

Although any surfactant can be used in the emulsification step in the production method according to the present invention without limitation, anionic surfactants can be preferably used. Examples of the anionic surfactant include fatty acid salts such as sodium laurate, potassium myristate, sodium palmitate, potassium oleate, sodium linolenate, and sodium rosinate; alkylbenzene sulfonates such as sodium dodecylbenzenesulfonate, potassium dodecylbenzenesulfonate, sodium decylbenzenesulfonate, potassium decylbenzenesulfonate, sodium cetylbenzenesulfonate, and potassium cetylbenzenesulfonate; alkyl sulfosuccinates such as sodium di(2-ethylhexyl) sulfosuccinate, potassium di(2-ethylhexyl) sulfosuccinate, and sodium dioctyl sulfosuccinate; alkyl sulfate ester salts such as sodium lauryl sulfate and potassium lauryl sulfate; polyoxyethylene alkyl ether sulfate ester salts such as sodium polyoxyethylene lauryl ether sulfate and potassium polyoxyethylene lauryl ether sulfate; monoalkyl phosphates such as sodium lauryl phosphate and potassium lauryl phosphate; and the like.

Among these anionic surfactants, fatty acid salts, alkylbenzene sulfonates, alkyl sulfosuccinates, alkyl sulfate ester salts, and polyoxyethylene alkyl ether sulfate ester salts are preferable, and fatty acid salts and alkylbenzene sulfonates are particularly preferable.

Further, the use of at least one selected from the group consisting of alkylbenzene sulfonates, alkyl sulfosuccinates, alkyl sulfate ester salts, and polyoxyethylene alkyl ether sulfate ester salts in combination with fatty acid salts is preferable, and the use of an alkylbenzene sulfonate in combination with a fatty acid salt is particularly preferable because the generation of aggregates is suppressed in the production of the polymer latex. Here, preferred fatty acid salts are sodium rosinate and potassium rosinate, and preferred alkylbenzene sulfonates are sodium dodecylbenzenesulfonate and potassium dodecylbenzenesulfonate. Further, one of these surfactants may be used alone, or two or more of them may be used in combination.

Further, in the production method according to the present invention, a surfactant other than anionic surfactants may be used in combination, and examples of the surfactant other than anionic surfactants include copolymerizable surfactants such as sulfoesters of α,β-unsaturated carboxylic acids, sulfate esters of α,β-unsaturated carboxylic acids, and sulfoalkyl aryl ethers.

Further, any nonionic surfactant can be used as long as coagulation by a coagulant used in dip-molding is not inhibited. Nonionic surfactants such as polyoxyethylene alkyl ethers, polyoxyethylene alkyl phenol ethers, polyoxyethylene alkyl esters, and polyoxyethylene sorbitan alkyl esters may be used in combination.

The amount of the nonionic surfactant to be used is preferably 0.1 to 50 parts by weight, more preferably 0.5 to 40 parts by weight, further more preferably 5 to 30 parts by weight with respect to 100 parts by weight of the total conjugated diene polymer contained in the organic solvent solution. In the case of using two or more surfactants, the total amount of the surfactants to be used preferably falls within the aforementioned ranges. The use of an excessively small amount of surfactant may cause a large amount of aggregates during emulsification, or conversely, an excessively large amount thereof is likely to cause foaming, and therefore may result in a dip-molded product having pinholes.

The amount of water to be used in the emulsification step in the production method according to the present invention is preferably 10 to 1,000 parts by weight, more preferably 30 to 500 parts by weight, most preferably 50 to 100 parts by weight with respect to 100 parts by weight of the organic solvent solution of the conjugated diene polymer (B). Examples of the type of water to be used include hard water, soft water, deionized water, distilled water, zeolite water and the like, and soft water, deionized water, and distilled water are preferable.

During the emulsification of the organic solvent solution of the conjugated diene polymer (B) in water in the presence of the surfactant, in general, any emulsifying apparatus commercially available as an emulsifying machine or a disperser can be used without limitation. The surfactant can be added to the organic solvent solution of the conjugated diene polymer (B) by any method without limitation. The surfactant may be added in advance to either or both of water and the organic solvent solution of the conjugated diene polymer (B), or may be added in batch or in portions to a liquid to be emulsified during the emulsification process.

Examples of the emulsifying apparatus which can be used include batch emulsifying machines such as "Homogenizer" (product name, manufactured by IKA Works), "POLYTRON" (product name, manufactured by Kinematica AG), and "TK AUTO-HOMO MIXER" (product name, manufactured by Tokushu Kika Kogyo Co., Ltd.); continuous emulsifying machines such as "TK PIPELINE-HOMO MIXER" (product name, manufactured by Tokushu Kika Kogyo Co., Ltd.), "Colloid mill" (product name, manufactured by Shinko Pantec Co., Ltd.), "SLASHER" (product name, manufactured by NIPPON COKE & ENGINEERING CO., LTD.), "Trigonal wet grinder" (product name, manufactured by Mitsui Miike Chemical Engineering Machinery, Co., Ltd.), "CAVITRON" (product name, manufactured by Eurotec, Ltd.), "MILDER" (product name, manufactured by Pacific Machinery & Engineering Co., Ltd.), and "FINE FLOW MILL" (product name, manufactured by Pacific Machinery & Engineering Co., Ltd.); high-pressure emulsifying machines such as "Microfluidizer" (product name, manufactured by MIZUHO INDUSTRIAL CO., LTD.), "NANOMIZER" (product name, manufactured by NANOMIZER Inc.), and "APV GAULIN" (product name, manufactured by Manton-Gaulin Company); membrane emulsifying machines such as "Membrane emulsifying machine" (product name, manufactured by REICA Co., Ltd.); vibratory emulsifying machines such as "VIBROMIXER" (product name, manufactured by REICA Co., Ltd.); ultrasonic emulsifying machines such as "Ultrasonic homogenizer" (product name, manufactured by Branson Ultrasonics Corporation); and the like. The conditions for the emulsification process using such an emulsifying apparatus are not particularly limited, and the treatment temperature, the treatment time, and the like may be appropriately determined to ensure a desired dispersion state.

In the production method according to the present invention, the organic solvent is desirably removed from the emulsion obtained by the emulsification process. Preferred methods for removing the organic solvent from the emulsion include methods of reducing the content of the organic solvent (preferably an aliphatic hydrocarbon solvent) in the emulsion to 500 weight ppm or less, and methods such as vacuum distillation, normal pressure distillation, water vapor distillation, and centrifugation can be employed, for example.

Further, to increase the solids content of the polymer latex, a concentration process may be performed as needed by a method such as vacuum distillation, normal pressure distillation, centrifugation, or membrane concentration. Centrifugation is preferably performed since the amount of residual surfactant in the polymer latex can be adjusted.

In the case where the polymer latex is treated in a centrifuge, the pH of the polymer latex is preferably adjusted to 7 or more, more preferably to 9 or more by adding a pH adjuster in advance to improve the mechanical stability of the polymer latex. The pH adjuster is preferably an alkali metal hydroxide (such as sodium hydroxide or potassium hydroxide) or ammonia.

The centrifugation is preferably performed, for example, using a continuous centrifuge under the conditions in which the centrifugal force is preferably 4,000 to 5,000 G, the solids content of the polymer latex before centrifugation is preferably 2 to 15 wt %, the feed flow rate into the centrifuge is preferably 500 to 2000 Kg/hr, and the back pressure (gauge pressure) of the centrifuge is preferably 0.03 to 1.6 MPa.

The polymer latex thus obtained may contain additives generally used in the field of latex, such as pH adjusters, defoamers, preservatives, chelating agents, oxygen scavengers, dispersants, and antioxidants.

Examples of the pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; organic amine compounds such as trimethylamine and triethanolamine; and the like. Preferred are alkali metal hydroxides and ammonia.

The solids content of the polymer latex produced by the production method according to the present invention is preferably 30 to 70 wt %, more preferably 40 to 70 wt %.

<Latex Composition>

Further, a latex composition may be produced by compounding a crosslinker with the polymer latex obtained by the production method according to the present invention.

Examples of the crosslinker include sulfur such as powdered sulfur, sublimed sulfur, precipitated sulfur, colloidal sulfur, surface-treated sulfur, and insoluble sulfur; sulfur-containing compounds such as sulfur chloride, sulfur dichloride, morpholine disulfide, alkyl phenol disulfides, N,N'-dithio-bis(hexahydro-2H-azepinone-2), phosphorus-containing polysulfides, polymer polysulfides, and 2-(4'-morpholinodithio)benzothiazole; and the like. Among these, sulfur can be preferably used. One of the crosslinkers may be used alone, or two or more of them may be used in combination.

Although the content of the crosslinker is not particularly limited, the content is preferably 0.1 to 10 parts by weight, more preferably 0.2 to 3 parts by weight with respect to 100 parts by weight of the polymer contained in the polymer latex. Adjusting the content of the crosslinker within the aforementioned ranges can result in a molded film, such as a dip-molded product, having further improved tensile strength and tear strength.

In addition, preferably, the latex composition according to the present invention further contains a cross-linking accelerator.

As the cross-linking accelerator, any cross-linking accelerator generally used in film-molding such as dip-molding can be used. Examples thereof include dithiocarbamic acids, such as diethyldithiocarbamic acid, dibutyldithiocarbamic acid, di-2-ethylhexyldithiocarbamic acid, dicyclohexyldithiocarbamic acid, diphenyldithiocarbamic acid, and dibenzyldithiocarbamic acid, and zinc salts thereof; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthiocarbaylthio)benzothiazole, 2-(2,6-dimethyl-4-morpholinothio)benzothiazole, 2-(4'-morpholinodithio)benzothiazole, 4-morpholinyl-2-benzothiazyl disulfide, 1,3-bis(2-benzothiazylmercaptomethyl)urea, and the like. Zinc diethyldithiocarbamate, zinc dibutyldithiocarbamate, and zinc 2-mercaptobenzothiazole are preferable. One of the cross-linking accelerators may be used alone, or two or more of them may be used in combination.

The content of the cross-linking accelerator is preferably 0.05 to 5 parts by weight, more preferably 0.1 to 2 parts by weight with respect to 100 parts by weight of the polymer contained in the polymer latex. Adjusting the content of the cross-linking accelerator within the aforementioned ranges can result in a molded film, such as a dip-molded product, having further improved tensile strength and tear strength.

In addition, preferably, the latex composition according to the present invention further contains zinc oxide.

Although the content of the zinc oxide is not particularly limited, the content is preferably 0.1 to 5 parts by weight, more preferably 0.2 to 2 parts by weight with respect to 100 parts by weight of the polymer contained in the polymer latex. Adjusting the content of the zinc oxide within the aforementioned ranges can result in a molded film, such as a dip-molded product, having further improved tensile strength and tear strength while high emulsification stability is provided.

The latex composition according to the present invention can further contain optional compounding agents including antioxidants; dispersants; reinforcers such as carbon black, silica, and talc; fillers such as calcium carbonate and clay; ultraviolet absorbers; and plasticizers.

Examples of the antioxidants include phenolic antioxidants containing no sulfur atoms such as 2,6-di-4-methylphenol, 2,6-di-t-butylphenol, butylhydroxyanisole, 2,6-di-t-butyl-α-dimethylamino-p-cresol, octadecyl-3-(3,5-di-t-butyl-4-hydroxyphenyl)propionate, styrenated phenol, 2,2'-methylene-bis(6-α-methyl-benzyl-p-cresol), 4,4'-methylenebis(2,6-di-t-butylphenol), 2,2'-methylene-bis(4-methyl-6-t-butylphenol), alkylated bisphenols, and a butylated reaction product of p-cresol with dicyclopentadiene; thiobisphenol antioxidants such as 2,2'-thiobis-(4-methyl-6-t-butylphenol), 4,4'-thiobis-(6-t-butyl-o-cresol), and 2,6-di-t-butyl-4-(4,6-bis(octylthio)-1,3,5-triazin-2-ylamino)phenol; phosphite ester antioxidants such as tris(nonylphenyl) phosphite, diphenylisodecyl phosphite, and tetraphenyl dipropylene glycol diphosphite; sulfur ester antioxidants such as dilauryl thiodipropionate; amine antioxidants such as phenyl-α-naphthylamine, phenyl-β-naphthylamine, p-(p-toluenesulfonylamide)-diphenylamine, 4,4'-(α,α-dimethylbenzyl)diphenylamine, N,N-diphenyl-p-phenylenediamine, N-isopropyl-N'-phenyl-p-phenylenediamine, and butyl aldehyde-aniline condensate; quinoline antioxidants such as 6-ethoxy-2,2,4-trimethyl-1,2-dihydroquinoline; hydroquinone antioxidants such as 2,5-di-(t-amyl)hydroquinone; and the like. One of these antioxidants can be used alone, or two or more of them can be used in combination.

The content of the antioxidant is preferably 0.05 to 10 parts by weight, more preferably 0.1 to 5 parts by weight with respect to 100 parts by weight of the polymer contained in the polymer latex.

The latex composition according to the present invention can be prepared by any method without limitation. Examples thereof include a method of mixing the crosslinker and the optional compounding agents with the polymer latex using a disperser such as a ball mill, a kneader, or a disperser; a method of preparing an aqueous dispersion of ingredients other than the polymer latex, and thereafter mixing the aqueous dispersion with the polymer latex using the aforementioned disperser; and the like.

The latex composition according to the present invention preferably has a pH of 7 or more, more preferably a pH in the range from 7 to 13, further preferably a pH in the range from 8 to 12. Further, the solids content of the latex composition is preferably in the range from 15 to 65 wt %.

The latex composition according to the present invention is preferably aged (pre-crosslinked) before film molding such as dip-molding to produce a molded film, such as a dip-molded product, having further improved mechanical properties. Although the pre-crosslinking time is not particularly limited and depends also on the pre-crosslinking temperature, the pre-crosslinking time is preferably 1 to 14 days, more preferably 1 to 7 days. The pre-crosslinking temperature is preferably 20 to 40° C.

Then, after the pre-crosslinking, the latex composition is preferably stored at a temperature of 10 to 30° C. until it is fed to the film molding such as dip-molding. Storage at high temperature results in a molded film, such as a dip-molded product, having reduced tensile strength and tear strength in some cases.

Molded Film>

The molded film according to the present invention is a molded product in the form of a film made of the latex composition according to the present invention. The film thickness of the molded film according to the present invention is preferably 0.03 to 0.50 mm, more preferably 0.05 to 0.40 mm, particularly preferably 0.08 to 0.30 mm.

Although not particularly limited, the molded film according to the present invention is suitably a dip-molded product obtained by dip-molding the latex composition according to the present invention. The dip-molding is a method involving immersing a mold in the latex composition to deposit the composition on the surface of the mold, then pulling the mold out of the composition, and thereafter drying the composition deposited on the surface of the mold. The mold before the immersion in the latex composition may be preheated. Further, before the mold is immersed in the latex composition or after the mold is pulled out of the latex composition, a coagulant can be used as required.

Specific examples of methods for using the coagulant include a method of attaching the coagulant to the mold by immersing the mold in a coagulant solution before the immersion in the latex composition (anode coagulant dipping), and a method of immersing a mold, on which the latex composition has been deposited, in a coagulant solution (Teague coagulant dipping), and the like. The anode coagulant dipping is preferable in that a dip-molded product having less unevenness in thickness is obtained.

Specific examples of the coagulant include water-soluble polyvalent metal salts including metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; and sulfates such as calcium sulfate, magnesium sulfate, and aluminum sulfate. Among these, calcium salts are preferable, and calcium nitrate is more preferable. One of these water-soluble polyvalent metal salts can be used alone, or two or more of them can be used in combination.

The coagulant can be generally used as a solution in water, an alcohol, or a mixture thereof, and is preferably used in the form of an aqueous solution. The aqueous solution may further contain a water-soluble organic solvent such as methanol or ethanol, and a nonionic surfactant. Although the concentration of the coagulant varies depending on the type of the water-soluble polyvalent metal salts, the concentration is preferably 5 to 50 wt %, more preferably 10 to 30 wt %.

The mold after pulled out of the latex composition is generally heated to dry the deposit famed on the mold. The drying conditions may be appropriately selected.

Then, the dip layer obtained is subjected to heat treatment for cross-linking. Before the heat treatment, immersion in water, preferably hot water at 30 to 70° C. for about 1 to 60 minutes may be performed to remove water-soluble impurities (such as excess emulsifier and coagulant). Although the water-soluble impurities may be removed after the heat treatment of the dip-molded layer, those impurities are preferably removed before the heat treatment since those can be removed more efficiently.

The dip-molded layer is cross-linked by heat treatment generally at a temperature of 80 to 150° C., preferably, for 10 to 130 minutes. As a heating method, external heating methods using infrared rays or heated air or internal heating methods using high-frequency waves can be employed. Among these, external heating using heated air is preferable.

Then, a dip-molded product is obtained as a molded film by detaching the dip-molded layer from the mold for dip-molding. As a detaching method, a method of peeling the film from the mold for forming by hand or a method of peeling the film by water pressure or pressure of compressed air can be employed. After the detachment, heat treatment at a temperature of 60 to 120° C. for 10 to 120 minutes may be further performed.

Besides dip-molding of the latex composition according to the present invention, the molded film according to the present invention may be obtained by any method (such as coating method) which enables formation of the latex composition according to the present invention into a film.

The molded film according to the present invention can be suitably used as a glove, for example. In the case where the molded film forms a glove, inorganic fine particles made of talc, calcium carbonate, or the like or organic fine particles such as starch particles may be spread on the surface of the glove, an elastomer layer containing fine particles may be famed on the surface of the glove, or the surface layer of the glove may be chlorinated in order to prevent the adhesion of contacting parts of the molded film and allow the glove to be put on and taken off more smoothly.

Further, other than the aforementioned glove, the molded film according to the present invention can be used as medical supplies such as baby bottle nipples, droppers, tubes, water pillows, balloon stalls, catheters, and condoms; toys such as air balls, dolls, and balls; industrial supplies such as pressure molding bags and gas storage bags; fingerstalls; and the like.

<Adhesive Composition>

In the present invention, the latex composition according to the present invention can be used as an adhesive composition.

The content (solids content) of the latex composition in the adhesive composition is preferably 5 to 60 wt %, more preferably 10 to 30 wt %.

The adhesive composition preferably contains an adhesive resin in addition to the latex composition according to the present invention. Although the adhesive resin is not particularly limited, a resorcinol-formaldehyde resin, a melamine resin, an epoxy resin, and an isocyanate resin can be suitably used, for example. Among these, a resorcinol-formaldehyde resin is preferable. A known resorcinol-formaldehyde resin (such as those disclosed in Japanese Patent Application Laid-Open No. 55-142635) can be used. The reaction ratio of resorcinol to formaldehyde is generally 1:1 to 1:5, preferably 1:1 to 1:3 in tams of the molar ratio of "resorcinol:formaldehyde".

For further enhancing the adhesion of the adhesive composition, the adhesive composition can contain 2,6-bis(2,4-dihydroxyphenylmethyl)-4-chlorophenol or a similar compound, an isocyanate, a blocked isocyanate, ethylene urea, polyepoxide, modified polyvinyl chloride resin, and the like, which are conventionally used.

Further, the adhesive composition can contain a vulcanization aid. Containing a vulcanization aid can improve the mechanical strength of the later-described composite to be obtained using the adhesive composition. Examples of the vulcanization aid can include quinone dioximes such as p-quinone dioxime; methacrylic acid esters such as lauryl methacrylate and methyl methacrylate; allyl compounds such as DAF (diallyl fumarate), DAP (diallyl phthalate), TAC (triallyl cyanurate), and TAIC (triallyl isocyanurate); maleimide compounds such as bismaleimide, phenylmaleimide, and N,N-m-phenylenedimaleimide; and the like.

<Substrate with Adhesive Layer>

The substrate with an adhesive layer according to the present invention is obtained by forming an adhesive layer on a surface of a substrate using the latex composition or the adhesive composition according to the present invention.

Although the substrate is not particularly limited, a fiber substrate can be used, for example. The type of fibers constituting the fiber substrate is not particularly limited, and examples thereof include vinylon fibers, polyester fibers, polyamide fibers such as nylon and aramid (aromatic polyamide) fibers, glass fibers, cotton, rayon, and the like. These can be appropriately selected according to the application. The shape of the fiber substrate is not particularly limited, and examples thereof can include shapes of staples, filaments, cords, ropes, woven fabrics (such as canvas), and the like, which can be appropriately selected according to the application.

For example, the substrate with an adhesive layer can be used as a substrate-rubber composite by bonding to a rubber via the adhesive layer. Although the substrate-rubber composite is not particularly limited, examples thereof include a toothed rubber belt with a core using a fiber substrate in the form of a cord, a toothed rubber belt using a fiber substrate in the form of a base fabric such as a canvas, and the like.

Although any method for obtaining the substrate-rubber composite can be used without limitation, examples thereof include a method of applying the latex composition or the adhesive composition according to the present invention to the substrate, for example, by immersion and the like to obtain the substrate with an adhesive layer, and placing the substrate with an adhesive layer on a rubber, followed by heating and pressurization. The pressurization can be performed using a compression (press) molding machine, a metal roll, an injection molding machine, or the like. The pressure for the pressurization is preferably 0.5 to 20 MPa, more preferably 2 to 10 MPa. The heating temperature is preferably 130 to 300° C., more preferably 150 to 250° C. The heating and pressurization time is preferably 1 to 180 minutes, more preferably 5 to 120 minutes. The heating and pressurization method enables the molding of the rubber and the adhesion between the substrate with an adhesive layer and the rubber to be performed simultaneously. A mold for imparting a desired surface shape to the rubber of the substrate-rubber composite is preferably famed on the inner surface of the mold of the compressor or the surface of the roll used for the pressurization.

Further, one aspect of the substrate-rubber composite can include a substrate-rubber-substrate composite. The substrate-rubber-substrate composite can be famed, for example, by combining a substrate (which may be a composite of two or more substrates) with the substrate-rubber composite. Specifically, a core serving as a substrate, a rubber, and a base fabric serving as a substrate are layered (at this time, the latex composition or the adhesive composition according to the present invention has been appropriately applied to the core and the base fabric to form substrates with an adhesive layer), followed by pressurization under heating, so that a substrate-rubber-substrate composite can be obtained.

The substrate-rubber composite obtained using the substrate with an adhesive layer according to the present invention is excellent in mechanical strength, abrasion resistance, and water resistance, and therefore can be suitably used as a belt such as a flat belt, a V belt, a V-ribbed belt, a round belt, a square belt, and a toothed belt. Further, the substrate-rubber composite obtained using the substrate with an adhesive layer according to the present invention can also be suitably used for hoses, tubes, diaphragms, and the like. Examples of the hoses include single-tube rubber hoses, multilayer rubber hoses, braided reinforced hoses, fabric-wrapped reinforced hoses, and the like. Examples of the diaphragms include flat diaphragms, rolling diaphragms, and the like.

The substrate-rubber composite obtained using the substrate with an adhesive layer according to the present invention can also be used as industrial products such as seals and rubber rolls in addition to the aforementioned applications. Examples of the seals include seals for moving parts such as rotating, swinging, and reciprocating parts and seals for fixed parts. Examples of the seals for moving parts include oil seals, piston seals, mechanical seals, boots, dust covers, diaphragms, accumulators, and the like. Examples of the seals for fixed parts include o-rings, various gaskets, and the like. Examples of the rubber rolls include rolls that are parts of QA equipment such as printers and copiers; fiber processing rolls such as stretching rolls for spinning and draft rolls for spinning; steel rolls such as bridle rolls, snubber rolls, and steering rolls; and the like.

EXAMPLES

Hereinafter, the present invention will be described specifically by way of Examples and Comparative Examples. In each example, the tam "parts" is based on weight unless otherwise specified. Note that the tests and the evaluations were carried out as follows.

<Solids Content>

2 g of each sample was accurately weighed (weight: X2) into an aluminum dish (weight: X1), followed by drying in a hot air dryer at 105° C. for 2 hours. Subsequently, after cooling in a desiccator, the weight thereof including the aluminum dish was measured (weight: X3) to calculate the solids content according to the following calculation formula.

$$\text{Solids content(wt \%)} = (X3-X1) \times 100/X2$$

<Weight Average Molecular Weight (Mw) and Molecular Weight Distribution (Mw/Mn)>

The organic solvent solution or the polymer latex was diluted with tetrahydrofuran to contain 0.1 wt % (in tams of solids content) of the conjugated diene polymer, and the resulting solution was subjected to gel permeation chromatography to calculate the weight average molecular weight (Mw) and the molecular weight distribution (Mw/Mn) as determined relative to polystyrene standards.

\<Solids Content at Viscosity at 60° C. of 20,000 Cps\>

After the weight average molecular weight of the conjugated diene polymer was reduced, the solids content of the resulting organic solvent solution at a viscosity at 60° C. of 20,000 cps was determined by the following method.

First, the viscosity of the organic solvent solution was measured according to the following method. Then, based on the result of the viscosity measurement, the amount of n-hexane needed to control the viscosity at 60° C. of the organic solvent solution to be 20,000 cps was determined. The determined amount of n-hexane was added to the organic solvent solution, and the viscosity was measured again. By repeating the process, an organic solvent solution having a viscosity at 60° C. of 20,000 cps was obtained.

Then, the solids content at a viscosity at 60° C. of 20,000 cps was determined by measuring the solids content of the organic solvent solution having a viscosity at 60° C. of 20,000 cps according to the aforementioned method.

In the case where the viscosity at 60° C. of the organic solvent solution was less than 20,000 cps, the aforementioned process was performed after the solvent was vaporized with an evaporator and it was confirmed that the viscosity at 60° C. reached 20,000 cps or more.

\<Viscosity Measurement of Organic Solvent Solution\>

The measurement was pertained using a B-type viscometer (type: BH, manufactured by TOKYO KEIKI INC.). Specifically, 200 mL of the organic solvent solution was placed in a 300 mL glass beaker, and was heated to 60° C. Any rotor of rotors No. 1 to 6 was immersed up to the line marked on the rotor, and the viscosity was measured.

\<Mechanical Stability of Polymer Latex\>

In accordance with a method described in ASTM D1417-10 "Determination of Mechanical Stability", the mechanical stability of the polymer latex was evaluated as follows.

In other words, "MS-5114" (manufactured by Ueshima Seisakusho Co., Ltd.) or "LL5110NA NK3" (manufactured by Source 2 trade Ltd.) was used to measure the mechanical stability. A stirring disk having a diameter of 20.83 (mm)+/−0.03 and a thickness of 1.57 (mm)+/−0.05 (mm) specified in ASTM D1076-10 was used in the measurement. A glass beaker having an inner diameter of 57.8 (mm)+/−1 (mm) specified in ASTM D1417-10 was also used. In a specific measurement method, 50 g of the polymer latex was accurately weighed, and was stirred for 30 minutes at a rotational speed of 14,000 rpm. Then, after stirred, the polymer latex was filtered through a wire mesh of 80 mesh. Thereafter, the mesh was washed with soapy water, which was then washed away with distilled water, and was dried at 105° C. for 2 hours. After the drying, the residue on the wire mesh was weighed, and the ratio (unit: wt %) of the residue to 50 g of the polymer latex was calculated. The mechanical stability was evaluated using the resulting value. It can be determined that a smaller value indicates higher mechanical stability and storage stability as a latex.

\<Tensile Strength of Dip-Molded Product\>

In accordance with ASTM D412, a dip-molded product was punched out using a dumbbell (product name "SUPER DUMBBELL (type: SDMK-100C)" manufactured by DUMBBELL CO., LTD.) to produce a test piece for tensile strength measurement. The test piece was stretched at a stretching speed of 500 mm/min using a TENSILON Universal Material Testing Instrument (product name "RTG-1210", available from ORIENTEC CORPORATION) to measure the tensile strength (unit: MPa) immediately before break.

\<Tear Strength of Dip-Molded Product\>

In accordance with ASTM D624-00, a dip-molded product was allowed to stand still in a constant-temperature and constant-humidity room at 23° C. and a relative humidity of 50% for 24 hours or more, and then was punched out using a dumbbell (product name "Die C", manufactured by DUMBBELL CO., LTD.) to prepare a test piece for tear strength measurement. The test piece was stretched at a stretching speed of 500 mm/min using a TENSILON Universal Material Testing Instrument (product name "RTG-1210", available from A&D Company, Limited) to measure the tear strength (unit: N/mm).

Example 1

(Preparation Step)

A synthetic polyisoprene having a weight average molecular weight (Mw) of 1,730,000 and a molecular weight distribution (Mw/Mn) of 4.56 (product name: "NIPOL IR2200", available from Zeon Corporation, a homopolymer of isoprene obtained using a Ziegler polymerization catalyst, the amount of cis-bond units: 98 wt %) was loaded into a Banbury mixer, and mechanical stress was applied at 180° C. for 0.5 hours, yielding a synthetic polyisoprene (a-1) having a reduced molecular weight.

The synthetic polyisoprene (a-1) obtained above was mixed with cyclohexane, and was dissolved therein by raising the temperature to 60° C. under stirring to prepare an organic solvent solution (b-1) of the synthetic polyisoprene. The obtained organic solvent solution (b-1) were measured to determine the weight average molecular weight (Mw), the molecular weight distribution (Mw/Mn), and the solids content at a viscosity at 60° C. of 20,000 cps according to the aforementioned method. The results are shown in Table 1.

(Emulsification Step)

10 parts of sodium rosinate was mixed with water to prepare a surfactant aqueous solution (c) having a sodium rosinate concentration of 1.5 wt % at a temperature of 60° C. Then, the organic solvent solution (b-1) of the synthetic polyisoprene and the surfactant aqueous solution (c) were mixed in a weight ratio of 1:1.5 using "Multi Line mixer MS26-MMR-5.5L" (product name) (available from SATAKE CHEMICAL EQUIPMENT MFG., LTD.), and then were mixed and emulsified at 4100 rpm using "MILDER MDN310" (product name) (available from Pacific Machinery & Engineering Co., Ltd.) to obtain an emulsion (d-1). Further, at that time, the total feed flow rate of the organic solvent solution (b-1) of the synthetic polyisoprene and the surfactant aqueous solution (c) was 2,000 kg/hr, the temperature was 60° C., and the back pressure (gauge pressure) was 0.5 MPa.

Subsequently, the emulsion (d-1) obtained above was heated to 80° C. under a reduced pressure of −0.01 to −0.09 MPa (gauge pressure), thereby distilling off n-hexane. Further, at that time, "SM5515" (product name) (available from Dow Corning Toray Co., Ltd.) was used as a defoamer, and was continuously added by spraying the defoamer in an amount of 300 ppm by weight with respect to the synthetic polyisoprene in the emulsion. When n-hexane was distilled off, the emulsion (d-1) was adjusted to 70 vol % or less of the tank volume, and stirring was gradually conducted at 60 rpm using a three-bladed inclined paddle as a stirring blade.

After the completion of distilling off of n-hexane, the emulsion (d-1) after the distilling off of n-hexane was centrifuged at 4,000 to 5,000 G using a continuous centrifuge (product name "SRG510", available from Alfa Laval AB) to obtain a synthetic polyisoprene latex (e-1) having a solids content of 62 wt % as a light liquid. The conditions for centrifugation were as follows: The solids content of the emulsion before centrifugation was 10 wt %, the flow rate during continuous centrifugation was 1300 kg/hr, and the back pressure (gauge pressure) of the centrifuge was 1.5 MPa. The obtained polymer latex (e-1) was measured to determine the mechanical stability according to the aforementioned method. The results are shown in Table 1.

(Preparation of Latex Composition)

While the synthetic polyisoprene latex (e-1) obtained above was being stirred, 10 wt % sodium dodecylbenzene sulfonate was added in an amount of 1 part in tams of solids content with respect to 100 parts by weight of the synthetic polyisoprene in the latex. Then, while the resulting mixture was being stirred, an aqueous dispersion containing 1.5 parts of zinc oxide, 1.5 parts of sulfur, 3 parts of an antioxidant (product name: "Wingstay L", available from Goodyear Tire and Rubber Company), 0.3 parts of zinc diethyldithiocarbamate, 0.5 parts of zinc dibutyldithiocarbamate, and 0.7 parts of mercaptobenzothiazole zinc salt in tams of solids content with respect to 100 parts of the synthetic polyisoprene in the mixture was added. Subsequently, a potassium hydroxide aqueous solution was added to adjust the pH to 10.5, and thus a latex composition was obtained.

Then, the obtained latex composition was aged in a constant-temperature water bath adjusted to 30° C. for 48 hours.

(Production of Dip-Molded Product)

A commercially available ceramic hand mold (manufactured by SHINKO CERAMICS CO., LTD.) was washed, followed by preheating in an oven at 70° C. Thereafter, the hand mold was immersed in a coagulant aqueous solution composed of 18 wt % of calcium nitrate and 0.05 wt % of polyoxyethylene lauryl ether (product name "EMULGEN 109P", manufactured by Kao Corporation) for 5 seconds, and was taken out. Subsequently, the hand mold coated with the coagulant was dried in an oven at 70° C. for 30 minutes or more.

Then, the hand mold coated with the coagulant was taken out of the oven, and was immersed for 10 seconds in the aged latex composition obtained above. Thereafter, the hand mold was air dried at room temperature for 10 minutes, and then was immersed in hot water at 60° C. for 5 minutes. Then, cross-linking was performed by heating the hand mold coated with a synthetic polyisoprene film in an oven at 130° C. for 30 minutes. Then, the hand mold coated with the cross-linked synthetic polyisoprene film was cooled to room temperature. Talc was spread, and the film was peeled from the hand mold to obtain a dip-molded product (glove). Then, the resulting dip-molded product (glove) was measured for the tensile strength and the tear strength according to the aforementioned methods. The results are shown in Table 1.

Example 2

A synthetic polyisoprene (a-2) having a reduced molecular weight was obtained in the same manner as in Example 1 except that a synthetic polyisoprene having a weight average molecular weight of 1,250,000 (product name: "NIPOL IR2200L", available from Zeon Corporation, a homopolymer of isoprene obtained using a Ziegler polymerization catalyst, the amount of cis-bond units: 98 wt %) was used.

Then, an organic solvent solution (b-2) of the synthetic polyisoprene was prepared in the same manner as in Example 1 except that the synthetic polyisoprene (a-2) obtained above was used. The results are shown in Table 1.

Then, a synthetic polyisoprene latex (e-2) having a solids content of 61 wt % was prepared in the same manner as in Example 1 except that the organic solvent solution (b-2) obtained above was used, and was evaluated in the same manner as above. The results are shown in Table 1.

Further, a latex composition and a dip-molded product were obtained in the same manner as in Example 1 except that the polymer latex (e-2) obtained above was used, and were evaluated in the same manner as above. The results are shown in Table 1.

Example 3

(Preparation Step)

The synthetic polyisoprene having a weight average molecular weight of 1,250,000 (product name: "NIPOL IR2200L", available from Zeon Corporation, a homopolymer of isoprene obtained using a Ziegler polymerization catalyst, the amount of cis-bond units: 98 wt %) was mixed with cyclohexane, and was dissolved therein by raising the temperature to 60° C. under stirring to prepare an organic solvent solution (a-3) of the synthetic polyisoprene.

Then, t-butyl peroxy-2-ethylhexanoate (product name: "PERBUTYL (trade mark) O", manufactured by NOF CORPORATION) was added to the organic solvent solution (a-3) obtained above to react at 70° C. for 1 hour. An organic solvent solution (b-3) containing the synthetic polyisoprene having a reduced molecular weight was thus prepared.

(Emulsification Step)

Then, a polymer latex (e-3) having a solids content of 63 wt % was prepared in the same manner as in Example 1 except that the organic solvent solution (b-3) obtained above was used, and was evaluated in the same manner as above. The results are shown in Table 1.

(Preparation of Latex Composition and Production of Dip-Molded Product)

Further, a latex composition and a dip-molded product were obtained in the same manner as in Example 1 except that the polymer latex (e-3) obtained above was used, and were evaluated in the same manner as above. The results are shown in Table 1.

Comparative Example 1

(Preparation of Organic Solvent Solution of Synthetic Polyisoprene)

The synthetic polyisoprene having a weight average molecular weight of 1,250,000 (product name: "NIPOL IR2200L", available from Zeon Corporation, a homopolymer of isoprene obtained using a Ziegler polymerization catalyst, the amount of cis-bond units: 98 wt %) was mixed with cyclohexane, and was dissolved therein by raising the temperature to 60° C. under stirring to prepare a an organic solvent solution (b-4) of the synthetic polyisoprene, and was evaluated in the same manner as above. The results are shown in Table 1.

(Emulsification Step)

Then, a polymer latex (e-4) having a solids content of 60 wt % was prepared in the same manner as in Example 1 except that the organic solvent solution (b-4) obtained above was used, and was evaluated in the same manner as above. The results are shown in Table 1.

(Preparation of Latex Composition and Production of Dip-Molded Product)

Further, a latex composition and a dip-molded product were obtained in the same manner as in Example 1 except that the polymer latex (e-4) obtained above was used, and were evaluated in the same manner as above. The results are shown in Table 1.

Comparative Example 2

An organic solvent solution (b-5) was prepared in the same manner as in Example 3 except that the reaction temperature was 90° C. and the reaction time was 2 hours in the preparation step, and was evaluated in the same manner as above. The results are shown in Table 1.
(Emulsification Step)
Then, a polymer latex (e-5) having a solids content of 60 wt % was prepared in the same manner as in Example 3 except that the organic solvent solution (b-5) obtained above was used, and was evaluated in the same manner as above. The results are shown in Table 1.
(Preparation of Latex Composition and Production of Dip-Molded Product)
Further, a latex composition and a dip-molded product were obtained in the same manner as in Example 3 except that the polymer latex (e-5) obtained above was used, and were evaluated in the same manner as above. The results are shown in Table 1.

Comparative Example 3

(Preparation of Organic Solvent Solution of Synthetic Polyisoprene)
1150 parts of n-hexane and 100 parts of isoprene were placed in a dried, nitrogen-purged autoclave equipped with a stirrer. The temperature in the autoclave was controlled to 60° C., and 0.07 parts of a hexane solution containing 15 wt % of n-butyllithium as a catalyst solution was added under stirring to react for 1 hour. The polymerization reaction ratio was 99%. 0.06 parts of methanol as a polymerization terminator was added to the resulting reaction liquid to terminate the reaction. An organic solvent solution (b-6) of a synthetic polyisoprene was thus prepared.
The obtained organic solvent solution (b-6) was measured to determine the weight average molecular weight (Mw), the molecular weight distribution (Mw/Mn), and the solids content at a viscosity at 60° C. of 20,000 cps according to the aforementioned method. The results are shown in Table 1.
(Emulsification Step)
Then, a polymer latex (e-6) having a solids content of 59 wt % was prepared in the same manner as in Example 1 except that the organic solvent solution (b-6) obtained above was used, and was evaluated in the same manner as above. The results are shown in Table 1.
(Preparation of Latex Composition and Production of Dip-Molded Product)
Further, a latex composition and a dip-molded product were obtained in the same manner as in Example 1 except that the polymer latex (e-6) obtained above was used, and were evaluated in the same manner as above. The results are shown in Table 1.
[Table 1]

TABLE 1

| | Conjugated diene polymer (A) | | | Conjugated diene polymer (B) | | | | Conditions for preparation step | | | Mechanical Stability (%) | Tensile strength (MPa) | Tear strength (N/m) |
|---|---|---|---|---|---|---|---|---|---|---|---|---|---|
| | Type | Mw (×10⁴) | Mw/Mn | Mw (×10⁴) | Mw/Mn | Reduction ratio of Mw | TSC | Method or substance used | Temperature (° C.) | Time (hr) | | | |
| Example 1 | Synthetic polyisoprene | 173 | 4.56 | 95 | 3.17 | 45% | 12 | Mechanical stress | 180 | 0.5 | 0.005 | 25 | 31 |
| Example 2 | Synthetic polyisoprene | 125 | 3.46 | 71 | 2.81 | 43% | 17 | Mechanical stress | 180 | 0.5 | 0.005 | 25 | 28 |
| Example 3 | Synthetic polyisoprene | 125 | 3.46 | 55 | 3.03 | 56% | 20 | Molecular cutting agent | 70 | 1 | 0.002 | 23 | 24 |
| Comparative Example 1 | Synthetic polyisoprene | 125 | 3.46 | — | — | — | 8 | — | — | — | 0.033 | 23 | 26 |
| Comparative Example 2 | Synthetic polyisoprene | 125 | 3.46 | 35 | 3.17 | 72% | 23 | Molecular cutting agent | 90 | 2 | 0.005 | 11 | 17 |
| Comparative Example 3 | Synthetic polyisoprene | 75 | 2.88 | — | — | — | 18 | — | — | — | 0.051 | 23 | 26 |

(In the table, TSC represents the amount (wt %. in terms of solids content) of the conjugated diene polymer in the organic solvent solution having a viscosity at 60° C. of 20,000 cps.)

As seen in Table 1, the polymer latices obtained by reducing the weight average molecular weight of the synthetic polyisoprene by 20 to 70% were produced with high productivity and had high mechanical stability, and provided a dip-molded product having high tensile strength and tear strength (Examples 1 to 3).

On the other hand, when the weight average molecular weight was not reduced, the obtained polymer latex had inferior mechanical stability (Comparative Example 1). Further, when the weight average molecular weight was reduced by more than 70%, the obtained dip molded product had inferior tensile strength and tear strength (Comparative Example 2).

In addition, as seen in Table 1, the polymer latex obtained by reducing the weight average molecular weight of the synthetic polyisoprene (Example 1) had superior mechanical stability to that of the polymer latex obtained without reducing the weight average molecular weight of the synthetic polyisoprene (Comparative Example 3).

The invention claimed is:
1. A method for producing a polymer latex comprising:
a preparation step of reducing the weight average molecular weight of a conjugated diene polymer (A) by 20 to 70 mass % to obtain a conjugated diene polymer (B) in an organic solvent, the preparation step comprising either one of the following two methods:

obtaining the conjugated diene polymer (B) and then dissolving the conjugated diene polymer (B) in an organic solvent, or dissolving the conjugated diene polymer (A) in the organic solvent and then obtaining the conjugated diene polymer (B), thereby obtaining an organic solvent solution containing the conjugated diene polymer (B) having a weight average molecular weight lower than that of the conjugated diene polymer (A), and an emulsification step of emulsifying the organic solvent solution in water in the presence of a surfactant, thereby obtaining a polymer latex, wherein the molecular weight distribution of the conjugated diene polymer (B) is in the range from 2.7 to 3.3.

2. The method for producing the polymer latex according to claim 1, wherein in the preparation step, the conjugated diene polymer (B) is obtained by applying mechanical stress to the conjugated diene polymer (A) to reduce the weight average molecular weight of the conjugated diene polymer (A), and then is dissolved in an organic solvent to obtain the organic solvent solution containing the conjugated diene polymer (B).

3. The method for producing the polymer latex according to claim 1, wherein in the preparation step, a molecular cutting agent is added to the organic solvent solution containing the conjugated diene polymer (A) to reduce the weight average molecular weight of the conjugated diene polymer (A), thus obtaining the organic solvent solution containing the conjugated diene polymer (B).

4. The method for producing the polymer latex according to claim 3, wherein the molecular cutting agent is a peroxide or ozone.

5. The method for producing the polymer latex according to claim 1, wherein the weight average molecular weight of the conjugated diene polymer (A) is in the range from 1,000,000 to 5,000,000.

6. A method for producing a latex composition, comprising:

producing a polymer latex by the production method according to claim 1, and preparing a latex composition by compounding a crosslinker with the polymer latex.

7. A method for producing a molded film, comprising:

producing a latex composition by the production method according to claim 6, and preparing a molded film by dip-molding the latex composition.

8. The method for producing a polymer latex according to claim 1, wherein in the preparation step, the weight average molecular weight of the conjugated diene polymer (A) is reduced by 40 to 60 mass % to obtain the organic solvent solution containing the conjugated diene polymer (B).

9. The method for producing a polymer latex according to claim 1, wherein in the preparation step, the weight average molecular weight of the conjugated diene polymer (A) is reduced by 40 to 50 mass % to obtain the organic solvent solution containing the conjugated diene polymer (B).

* * * * *